US012699711B2

(12) United States Patent
Chandrasekaran et al.

(10) Patent No.: US 12,699,711 B2
(45) Date of Patent: Aug. 4, 2026

(54) METHOD AND SYSTEM FOR TARGET DEPENDENT DATA DISSECTION AND APPLICATION THEREOF

(71) Applicant: Verizon Patent and Licensing Inc., Basking Ridge, NJ (US)

(72) Inventors: Praveenkumar Chandrasekaran, Chennai (IN); Karthik Sadhasivam, Kumbakonam (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/919,723

(22) Filed: Oct. 18, 2024

(65) Prior Publication Data

US 2026/0111446 A1 Apr. 23, 2026

(51) Int. Cl.
　G06F 16/27 (2019.01)
　G06F 16/28 (2019.01)
(52) U.S. Cl.
　CPC .......... G06F 16/278 (2019.01); G06F 16/285 (2019.01)
(58) Field of Classification Search
　CPC ....................................... G06F 16/278

USPC ........................................... 707/687
See application file for complete search history.

(56) References Cited

U.S. PATENT DOCUMENTS

2015/0033086 A1 * 1/2015 Sasturkar .............. G06F 11/079
　　　　　　　　　　　　　　　　714/57

FOREIGN PATENT DOCUMENTS

WO WO-2022223094 A1 * 10/2022 ............ H04W 24/04

* cited by examiner

*Primary Examiner* — Syling Yen

(57) ABSTRACT

The present teaching relates to target dependent data dissection. A network management operation specifies a target and accordingly defines a dissection objective function (DOF) characterizing an operational aspect of a network. Combinations of features of a data set collected from the network are generated and used to dissect the data set to generate partitions of the network, producing a set of sub-network segments in different partitions. A DOF score is computed for each sub-network segment to characterize the operational aspect thereof. Significant sub-network segments are identified based on DOF scores. An action is determined for each of the significant sub-network segments to control the operational aspect thereof.

20 Claims, 14 Drawing Sheets

<u>100</u>

Retrieve configured target
related DOF parameters 305

Determine configured target
and relevant features 315

Extract configured features
with respect to the target 325

Determine data dissection
parameters configured 335

Hierarchically dissect the data
via features & parameters 345

Generate TIDS via
data segments 355

Receive data features extracted
based on DOFi 405

Generate feature combinations
FCs at different layers 415

Generate data segments via
layered dissection via FCs 425

Compute segment scores via
specified DOFi 435

Select top segments based on
segment scores 445

Output selected top segments
with interpretation via FCs 455

600

700

METHOD AND SYSTEM FOR TARGET DEPENDENT DATA DISSECTION AND APPLICATION THEREOF

BACKGROUND

Network operational data, customer activity data, online commerce data, and user communications data is collected regularly by telecommunications providers. This data is helpful in maintaining the health of a network, meeting service level agreements, and ensuring effectiveness of security and remedial measures. To learn from the collected data, patterns must be identified in data relevant to each specific application. Supervised classification and/or clustering have been used in the past to partition data into segments to achieve such a goal.

BRIEF DESCRIPTION OF THE DRAWINGS

The methods, systems and or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION OF EXAMPLE EMBODIMENTS

Figure 1A:
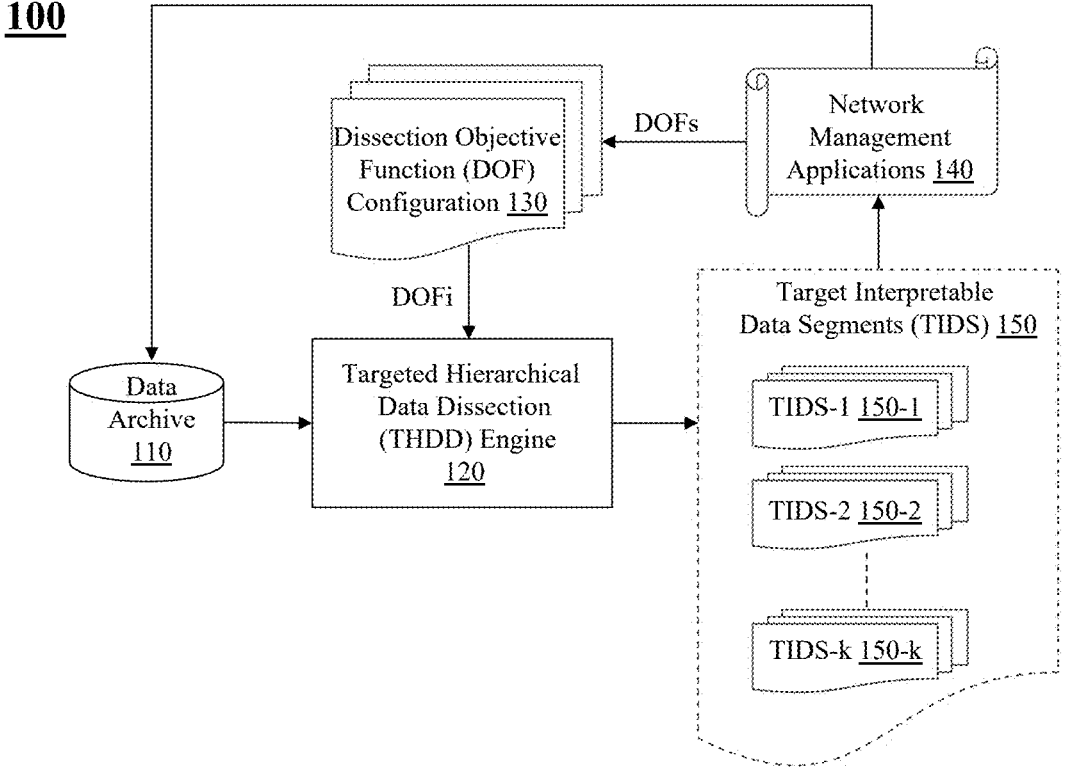
FIG. 1A depicts an exemplary framework for hierarchical dissection of network management data based on target dependent dissection objective functions (DOFs), in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

With increasing amounts of data available, it is difficult to identify relevant and useful information. Data may be partitioned based on some specified features via, e.g., either classification or clustering, to identify groups of interest in a population, e.g., a sub-network that has an abnormally high malfunction level or a group of customers with a high potential to churn. Identifying such at-risk segments may facilitate adoption of appropriate measures to prevent and/or diagnose difficulties. Although such traditional approaches such as classification and clustering are helpful in partitioning data, they are computationally expensive and inflexible identifying problematic segments in the data. In addition, the disjointed segments in a partition created by traditional approaches do not usually have well defined boundaries, let alone what the boundaries mean. Traditional segmentation and clustering techniques tend to be "bottom-up" approaches without considering the actual goal of the segmentation. As such, the result obtained from a traditional data segmentation method is generally not easily interpretable. However, in many applications, there is a desire to look for specific and targeted information in order to address a particular problem. In this situation, a data analytics approach is useful if a target sought is incorporated into the data processing process in a meaningful way.

The present teaching discloses a scheme to dissect data with a target incorporated into the dissection process to facilitate identification of most significant data segments with respect to the target. As the dissection process is target dependent, the resultant data segments are interpretable. The significance of each data segment may be measured via a dissection objective function (DOF), which is defined with respect to the target. For example, in an exemplary application relating to network management, it may need to identify different network segments that exhibit a certain targeted behavior (e.g., malfunction, lack of resource, etc.). Each targeted behavior may be motivated by a desire to address a particular type of problem in network management. Depending on the target, data may be sliced in different ways in order to reveal segments of the network that are the most significant with respect to a problem to be address. That is, different tasks in network management may need to see different information and accordingly different portions of the network.

Exemplary aspects of network management may include performance control, resource allocation, or customer management and may be carried out as different tasks. Each task may be performed based on some targeted knowledge about the network to be identified based on network operational data. For instance, to control the quality of network performance, the targeted observation (or, the "target") may relate to network malfunction (e.g., network element malfunction). Recognizing sub-networks (segments of a network) prone to malfunction may be of great interest to enable preemptive measures to promptly prevent problems. Where the task may be related to managing resource allocation in network operation, the targeted information (i.e., the target) may relate to resource adequacy of different paths (segments) of the network, information crucial to enabling prompt resource sharing/allocation across network segments. For a task related to customer management, customer groups that exhibit a higher likelihood of churn (segments of customers) may be the targeted information to be observed. Each of the above example tasks requires identification of data segments that exhibit certain characteristics consistent with a defined underlying target. As the boundaries of interested data segments may morph over time, data needs to be dissected in a flexible and dynamic ways to adapt to the changing situation.

The data dissection scheme according to the present teaching allows flexible and target dependent dissection of data to identify the most significant data segments with respect to a dissection objective function (DOF) defined with respect to a target corresponding to the application need. Data is sliced in different ways at multiple levels in a hierarchical manner, the DOF scores may be accordingly computed for resultant segments so that the most significant segments may be selected based on the DOF scores of the segments. Data is sliced in different ways based on a different combinations of data features determined with respect to the target. For example, for network performance control (a task in network management) with targeted information relating to malfunction, features used to slice the data may include service regions, subnets, towers, and the associated operational data of network components. For customer management (a different task in network management), the target may be the churn rate and features used to slice the data may include, e.g., service types, service history, demographics, geographic regions, etc. that may typically be relevant to customer behaviors.

Given a task, a defined target, and features associated with the target, the data dissection scheme according to the present teaching is provided to identify all possible segments sliced using different combination of features with each created segment having a DOF score. The data segments with the highest DOF scores (e.g., top 10 DOF scores) may be selected as the most significant segments with respect to the target. Each such identified data segment is associated with a well-defined set of feature values so that it is interpretable, providing guidance as to where the targeted population with a certain characteristic is distributed, e.g., where the population is located geographically. In some situations, as the significant segments may be identified from different partitions, overlap may exist.

FIG. 1A depicts an exemplary framework 100 for identifying interpretable significant segments from data with respect to a target related to network management by dissecting collected network operational data based on target dependent DOFs, in accordance with an embodiment of the present teaching. In this illustrated framework 100, network management applications 140 manage different aspects of operations of a network and archive various data collected during the operation in a data archive 110. Such collected data in 110 may be dissected by a targeted hierarchical data dissection (THDD) engine 120 in ways according to different targets and DOFs configuration 130 specified by different network management applications 140. The DOFs are configured by different network management applications according to the respective tasks they perform. Through data dissections based on DOFs from 130, the THDD engine 120 generates respective target interpretable data segments (TIDS) 150, which reveal insights sought for by different network management applications and facilitate these applications to carry out different tasks related to network management according to the TIDs created with respect to the associated targets.

Figure 1B:
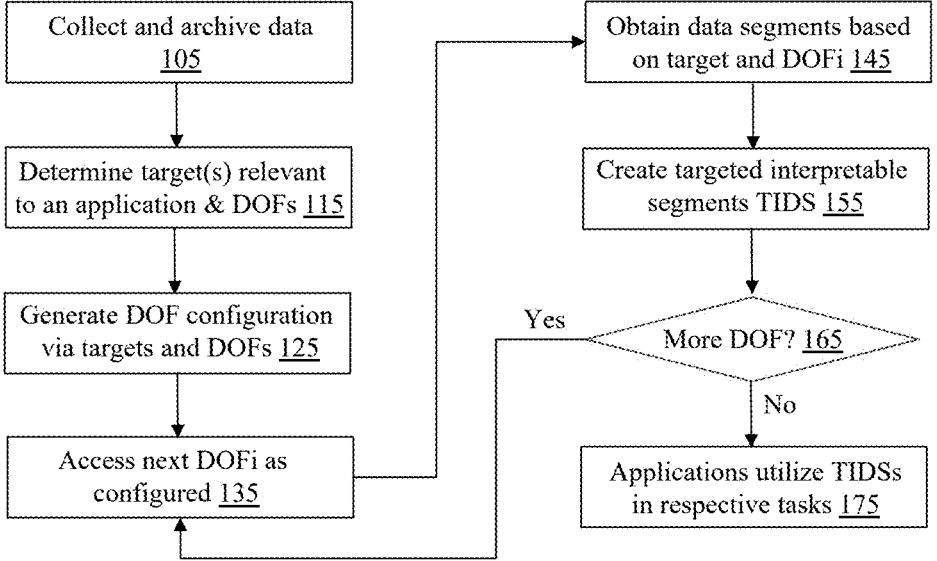
FIG. 1B is a flowchart of an exemplary process of a framework for hierarchical dissection of network management data based on target dependent DOFs, in accordance with an embodiment of the present teaching.

FIG. 1B is a flowchart of an exemplary process of framework 100 for hierarchical dissection of network management data based on target dependent DOFs, in accordance with an embodiment of the present teaching. During the operations of a network, various data associated with the operations are collected and archived at 105. To carry out respective tasks, different network management applications in 140 determine, at 115, corresponding targets with respect to the tasks and associated target dependent DOFs. Such DOFs are then used to generate the DOF configuration 130 at 125, which are to be used by different applications in 140 to generate relevant data segments to facilitate them to perform different tasks. As discussed herein, each network management application may be provided to perform a designated task. For instance, a network management application may be provided to detect potential malfunction in different sub-networks while another network management application may be provided to balance resource allocation to different regional sub-networks, etc. Depending on the tasks to be performed, corresponding network management applications may define targets to be observed as well as DOFs used for data dissection in order to identify desired targets.

Based on the target dependent DOFs configured in 130, the THDD engine 120 may then dissect the archived data in 110 according to each of the DOFs configured to generate desired targeted TIDS 150. For instance, a DOF-1 may be provided with respect to an application for minimizing malfunction (in network management applications 140) and when this DOF is applied, the THDD engine 120 generates, e.g., TIDS-1 150-1. Similarly, a different DOF-2 may also be configured in 130 by a different application in 140, e.g., for balancing resource allocation across different sub-networks. When DOF-2 is used to dissect the archived data 110, the THDD engine 120 generates a different set of segments TIDS-2 150-2, that provide useful information for the resource allocation application to determine how to balance the resources across different sub-networks. In the flowchart in FIG. 1B, when the THDD engine 120 accesses, at 135, a next DOFi, it performs data dissection based on DOFi to obtain, at 145, data segments accordingly and create, at 155, the corresponding TIDS-i. The DOF based dissection process continues with respect to all configured DOFs until, determined at 165, all needed TIDSs are generated for different network management applications 140, which may then utilize the TIDSs, at 175, to carry out their respective tasks based on the data segments derived according to respective target dependent DOFs.

Figure 2A:
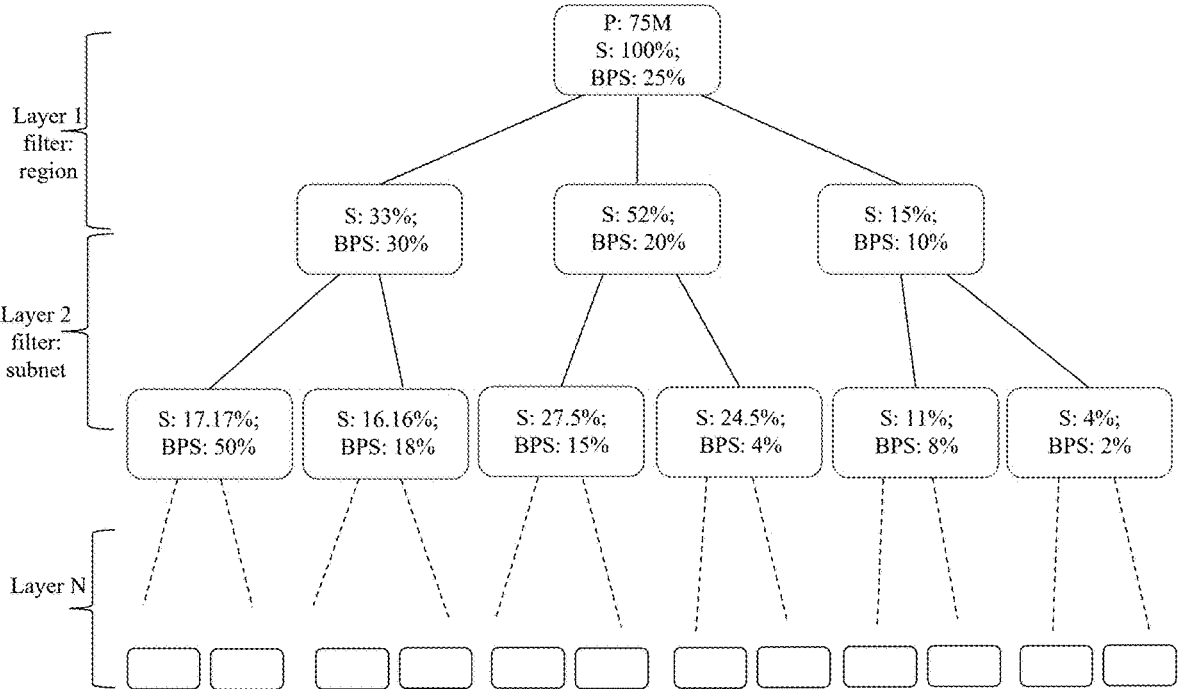
FIG. 2A shows exemplary data segments with top DOF scores selected from different data partitions of network management data, in accordance with an embodiment of the present teaching.

FIG. 2A shows exemplary data segments with top DOF scores selected from different data partitions of network management data, in accordance with an embodiment of the present teaching. In this illustration, the selected data segments present therein are at the different levels of data dissection hierarchy and the levels are determined based on the filtering features used to dissect the network management data in corresponding partitions. In this example, the underlying task is to identify network segments that may be prone to malfunction or bad network performance, the target observation is the negative performance exhibited, and a DOF is defined with respect to this target and may be formulated as a bad performance score (BPS). Features used to slice the network data may include geographic region, sub-network, etc. and different features or feature combinations may be used in dissecting the data in creating different partitions at different levels. In some embodiments, some dissection parameters may be used to control the dissection. For example, a minimal segment size may be specified to ensure that any data segment resulted from the dissection satisfies this minimal size requirement.

In the example data dissection result in FIG. 2A, the top level shows that the full size (100%) of the data population is 75 million with a known BPS at 25%, which may be averaged over the entire population. Across this population, the task is to identify the most significant network segments that have the worst BPS so that something can be done to improve that. Through the data dissection scheme according to the present teaching, FIG. 2A shows the result of network segments that have top K BPSs, where K is also a control parameter. In this result, it can be seen that when the network is dissected based on region feature at layer 1, it may yield three segments with respective sizes of 33%, 52%, and 15% of the entire network having respective BPS of 30%, 20%, and 10%. At layer 2, the further feature used for filtering is subnet and the dissected segments at this level have respective BPSs of 50%, 18%, 15%, 4%, 8%, and 2%, representing the subnets that have the significant unsatisfactory performance metrics. In some situations, the dissection may further continue to subsequent layers until, say layer N, if more finely dissected segments are needed. This process may continue under certain conditions. For instance, if there is a restriction on the size of each segment, this may limit how many levels that a data segment may be further dissected. From this result, it is observed that a subnet of a population size of 17.7% has as high as 50% of BPS and the subnet in the same region of a population size of 16.6% has a 18% of BPS. That is, the two subnets in region 1 significantly contribute the bad performance of the entire network. It is noted that the first subnet with BPS 50% and the second subnet with 18% BPS may be selected from different partitions of network data obtained via different feature combinations according to the present teaching.

Figure 2B:
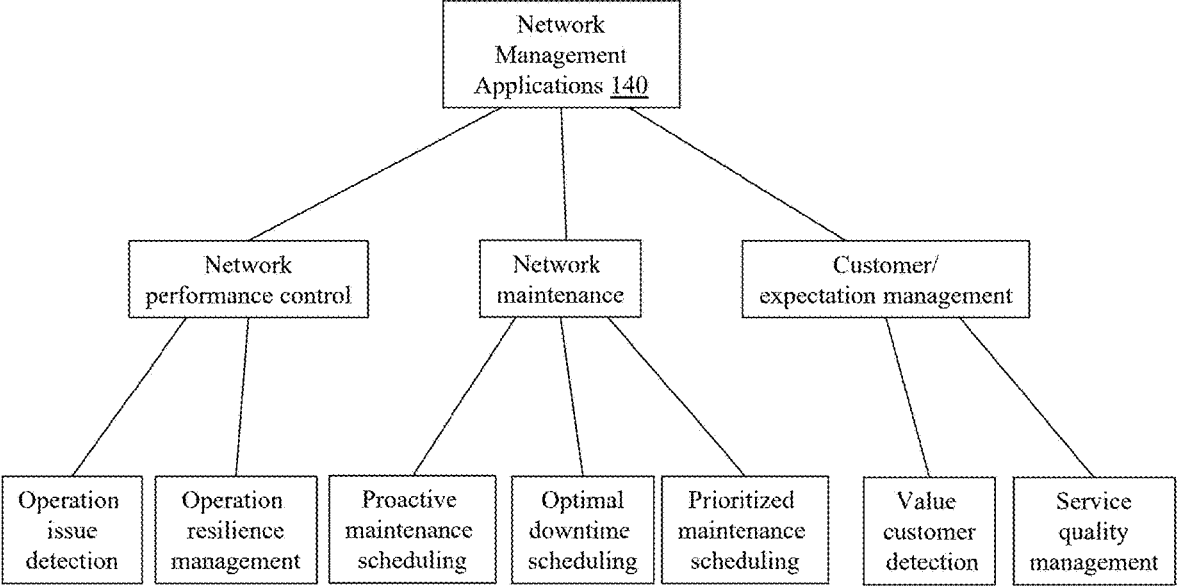
FIG. 2B illustrates different types of network management applications that may leverage the data dissection scheme in accordance with an embodiment of the present teaching.

As discussed herein, the network management applications 140 may include various applications provided for performing different tasks associated with network management. FIG. 2B illustrates different exemplary types of network management applications 140 that may leverage the data dissection scheme in accordance with an embodiment of the present teaching. These exemplary applications may be deployed for controlling the network performance, for performing network maintenance, or for managing the expectation/satisfaction of customers, as illustrated in FIG. 2B. More specifically, to control the network performance, an application may operate to detect operational abnormalities or issues and another application may operate to ensure resilience of the network performance. To maintain the network operation, an application may be deployed to schedule proactive maintenance, an application may be installed to make sure, according to the network status, optimal downtime caused by the maintenance activities, and another application may be used to prioritize the maintenance according to some criteria. On the customer front, an application may operate to detect value customers based on the dynamics of the network and another application may operate to monitor customer satisfaction with services and management thereof.

Figure 2C:
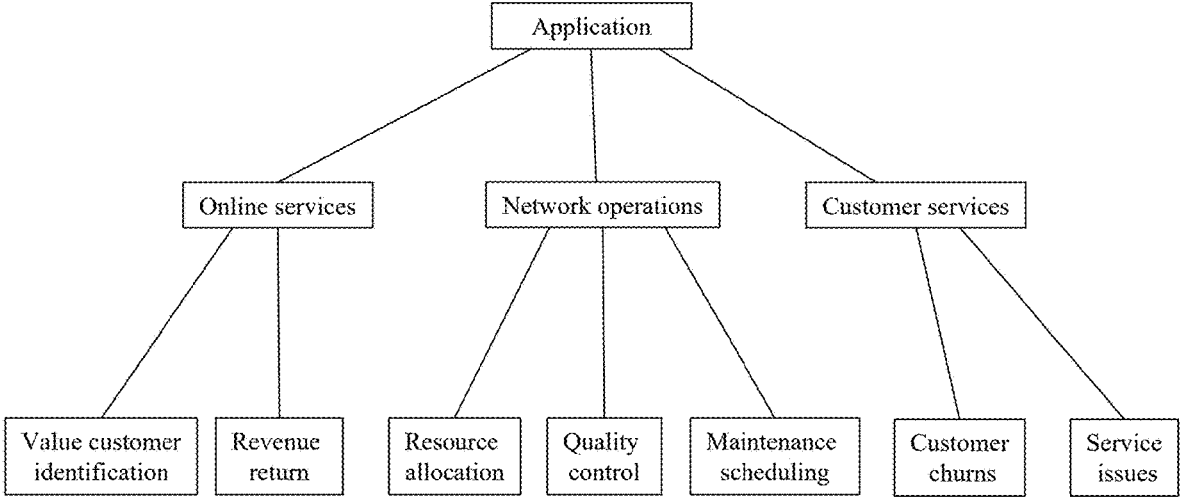
FIG. 2C illustrates different types of applications that may identify the most significant data segments based on target dependent DOFs defined based on application needs, in accordance with an embodiment of the present teaching.

The targeted data dissection scheme according to the present teaching may be used in a variety of situations. FIG. 2C shows different exemplary types of applications in not only network management, but also, e.g., in online services and customer services. As discussed herein, network resource allocation, network performance quality control, and network maintenance management may leverage the present teaching to identify most relevant significant network segments via the dissection scheme of the present teaching. For online services, via the dissection scheme as disclosed herein, value online customer segments may be identified. Alternatively, online service segments that yield the most significant revenue returns for a service provider may also be identified by applying the target dependent data dissection scheme as disclosed herein. For today's ever present customer services, customers churn is of concern of all so that it is important to have detection of customer churn propensity based on dynamically collected service data so that customer segments that represent significant risks of churn may be identified using the dissection scheme discussed herein. Significant issues occurred in serving customers may also be located via the target dependent data dissection scheme as described herein.

Figure 2D:
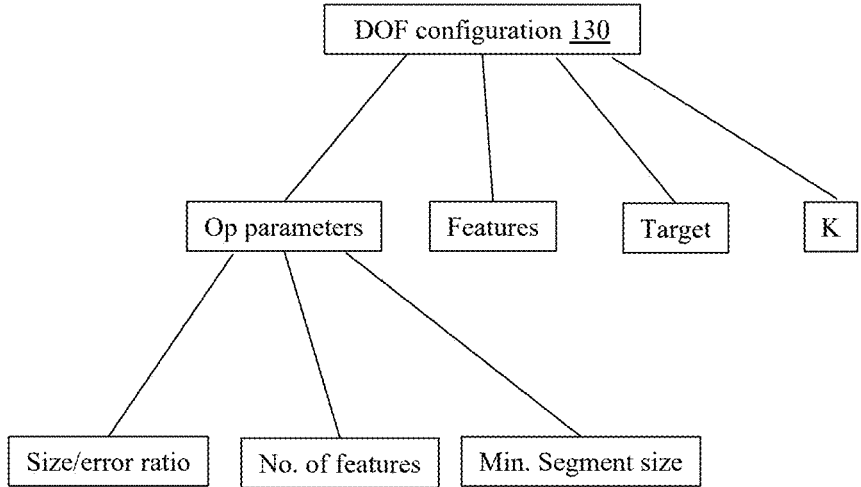
FIG. 2D illustrates exemplary types of parameters that may be incorporated in a target dependent DOF specified based on application needs, in accordance with an embodiment of the present teaching.

As discussed previously, according to the target dependent data dissection scheme, based on the need of an application, a target relevant to the application need may be identified and used to devise DOF(s) to be evaluated during data dissection to facilitate selection of the most significant data segments with respect to the target. FIG. 2D illustrates exemplary types of parameters that may be incorporated in a target dependent DOF configuration with respect to the target specified, in accordance with an embodiment of the present teaching. A DOF configuration in 130 may include a defined target (e.g., malfunction), features used to slice data defined with respect to the target (e.g., region in network service, a subnet in a region, and performance indicators), the number of most significant segments to be identified (e.g., K), and some operational parameters, including a minimal segment size (e.g., 15 network nodes), a size/error ratio (e.g., defined according to application needs), and a maximum number of features used to slice the data (e.g., 10). Details about how to utilize target dependent DOFs to dissect data to identify target related most significant data segments are provided below with reference to FIGS. 3A-5B.

Figure 3A:
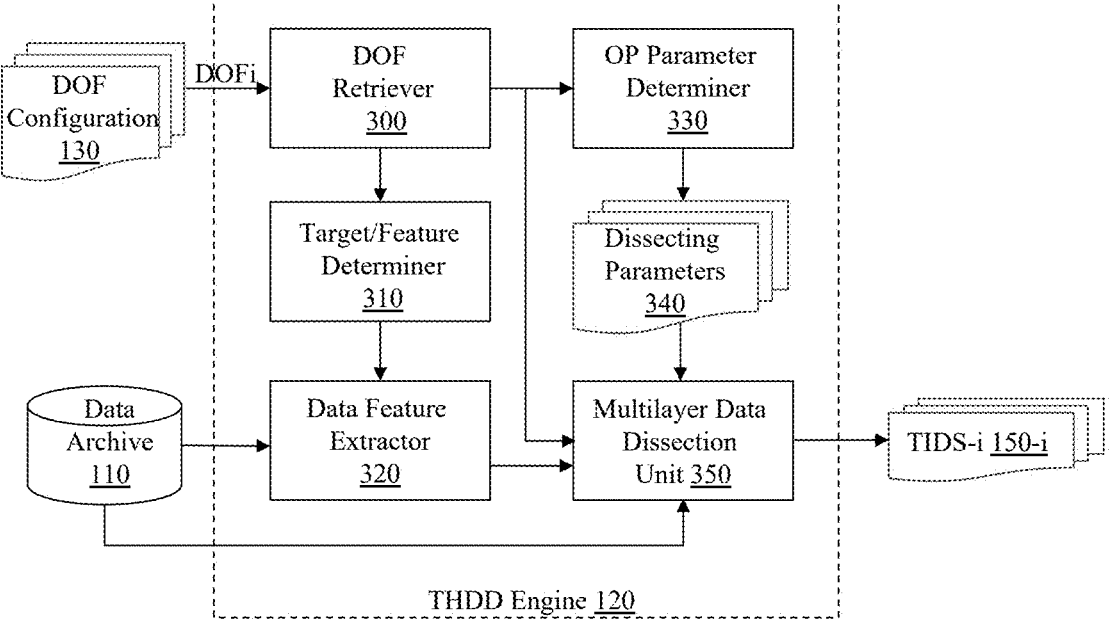
FIG. 3A depicts an exemplary system diagram of a targeted hierarchical data dissection (THDD) engine, in accordance with an embodiment of the present teaching.

FIG. 3A depicts an exemplary system diagram of the targeted hierarchical data dissection (THDD) engine 120 for obtaining the most significant TIDS (target interpretable data segments) with respect to a given target dependent DOF, in accordance with an embodiment of the present teaching. The input to the THDD engine 120 includes data stored in the data archive 110 and a DOF (e.g., DOFi) retrieved from the DOF configuration 130 and the output of the THDD engine 120 is a set of data segments (e.g., TIDS-I 150-*i*) identified from the data. In this illustrated embodiment, the THDD engine 120 comprises a DOF retriever 300, a target/feature determiner 310, an operational (OP) parameter determiner 330, a data feature extractor 320, and a multilayer data dissection unit 350. The DOF retriever 300 may be provided to retrieve, from the DOF configuration 130, each DOF specified by an application. The operational (OP) parameter determiner 330 may be provided to extract, from the retrieved DOF, the dissection related parameters 340 to be used to control the dissection process (e.g., the minimal size requirement and K segments with top DOF scores). The target/feature determiner 310 may be provided for extract the target defined in the DOF and the data features specified with respect to the target that may be used to hierarchically dissect the data. The multilayer data dissection unit 350 is provided to carry out the target dependent dissection of data from the data archive 110 based on the specified target, data features, DOF definition, and dissection parameters to generate TIDS-I (150-*i*) with top DOF scores.

Figure 3B:
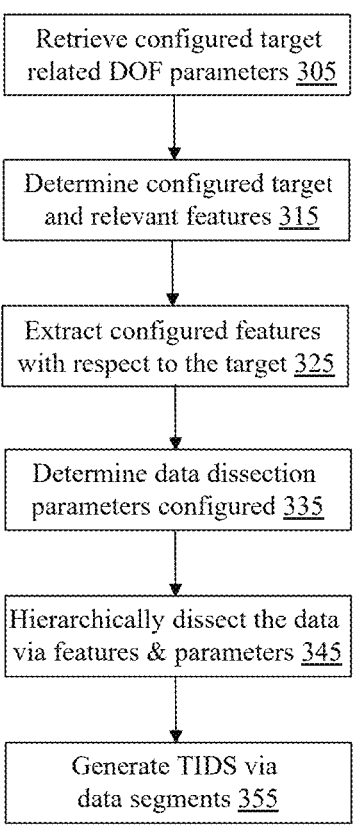
FIG. 3B is a flowchart of an exemplary process of a THDD engine, in accordance with an embodiment of the present teaching.

FIG. 3B is a flowchart of an exemplary process of the THDD engine 120, in accordance with an embodiment of the present teaching. In operation, the DOF retriever 300 first retrieves, at 305, the next target dependent DOF (e.g., DOFi) configured in 130. The retrieved DOF configuration is provided to the target/feature determiner 310 to determine, at 315, a target defined as well as data features that may be relevant when dissecting data to reveal the target information. With the determined data features to be used in dissecting data, the data feature extractor 320 is activated to extract, at 325, the specified features of the data from the data archive 110. In some embodiments, features of the data archived in 110 may also be previously extracted and stored with the data. In this situation, the data feature extractor 320 may retrieve such features directly from the data archive 110.

From the DOF retrieved for data dissection, to facilitate the dissection, the OP parameter determiner 330 may determine, at 335, operational parameters 340 (e.g., minimal segment size and K) to be used during the dissection process. Based on the inputs (i.e., data from the data archive 110, the target specified in the current DOF, the data features relevant to the target, as well as operational parameters 340), the multilayer data dissection unit 350 hierarchically dissects, at 345, the data by slicing data based on different combinations of data features at different levels of the dissection hierarchy to yield various data segments that satisfy the dissection parameters (e.g., all data segments have a size not smaller than the specified minimal size). For each of such obtained data segment, a DOF score is computed. For instance, when the target is related to malfunction, the DOF score of a segment may be determined based on the BPS of the subnet represented by the segment. Based on the specified parameter K, the most significant data segments with respect to the target having a top K DOF scores may be selected to generate, at 355, TIDSi 150-*i*. Details of the multilayer data dissection unit 350 are provided with reference to FIGS. 4A-4B.

Figure 4A:
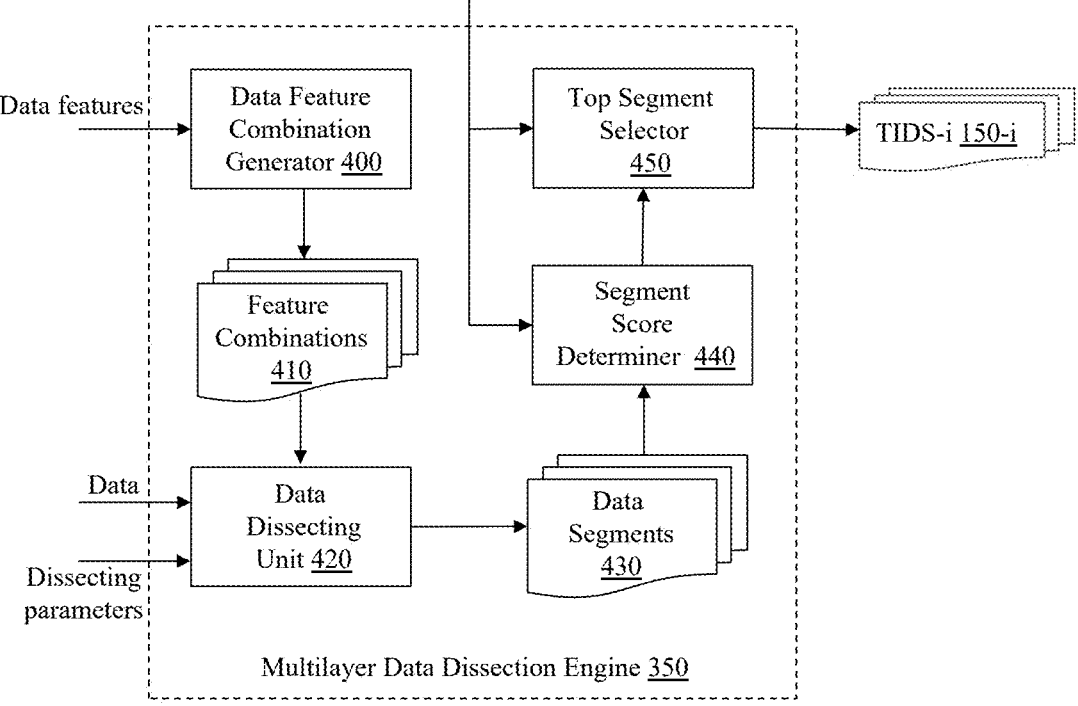
FIG. 4A depicts an exemplary system diagram of a multilayer data dissection engine, in accordance with an embodiment of the present teaching.

FIG. 4A depicts an exemplary system diagram of the multilayer data dissection unit 350, in accordance with an embodiment of the present teaching. In this illustrated embodiment, the multilayer data dissection engine 350 includes a data feature combination generator 400, a data dissection unit 420, a segment score determiner 440, and a top segment selector 450. The data feature combination generator 400 may be provided to take data features defined based on target and generate different combinations to be used to partition data in different ways. For example, if five data features (F1, F2, F3, F4, F5) are specified as relating to the target, there are different ways that these five features may be used in combinations for data dissection. One data partition may be generated by the following combination. F1 may be used at the first layer to divide the data into different segments. For any segment obtained at the first layer that has a size larger than the minimal size specified, it may be sliced at the second layer using F2 in combination with F5 to create data segments at the second layer. Any segment at the second layer larger than the minimal size may then be further sliced into yet more smaller segments using features F3 and F4. So, this sequence of slicing operation in the sequence of F1, (F2, F5), and (F3, F4) create a first group of data segments. Another way to partition data may use F4 at the first layer, F1 at the second layer, (F2, F3) at the third layer, and then F5 at the fourth layer if applicable. This way of partitioning the data create a second group of data segments, some of which may be the same as some in the first group but also some different data segments. Other combinations of data features may also be generated by the data feature combination generator 400 to, e.g., exhaust all possible combinations 410 to slice the data using the data features.

The data dissecting unit 420 is provided to carry out the data dissection based on different combinations of data features 410 according to the specified dissecting parameters (e.g., minimal size requirement for data segments), partitioning data in different ways with each partition including a group of data segments. For such generated data segments 430, the segment score determiner 440 may be provided to compute the DOF score for each of the data segments in 430 according to the defined target in DOFi. The top segment selector 450 may then operate to select, from all data segments identified in different partitions with their respective DOF scores, K data segments that have the highest DOF scores, where K is defined as part of the DOFi. The selected K data segments are then output as TIDS-i for an application that defines the DOFi.

Figure 4B:
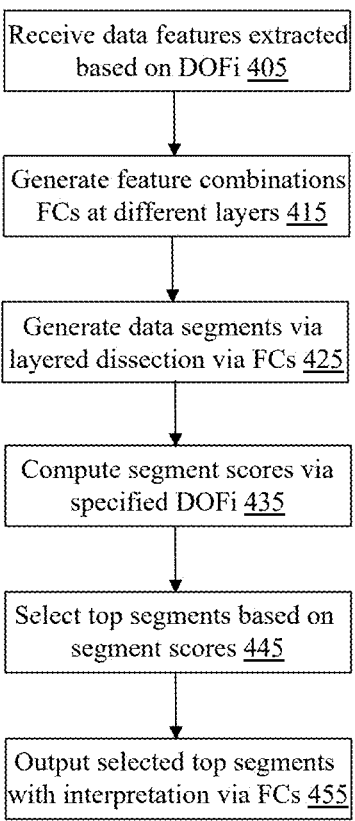
FIG. 4B is a flowchart of an exemplary process of a multilayer data dissection engine, in accordance with an embodiment of the present teaching.

FIG. 4B is a flowchart of an exemplary process of the multilayer data dissection unit 350, in accordance with an embodiment of the present teaching. In operation, the data feature combination generator 400 receives, at 405, the data features (extracted from data by the data feature extractor 320 in FIG. 3A), it generates, at 415, different combination of the data features used for slicing the data at different layers of the hierarchical dissection. Using each of the data feature combinations, the data dissecting unit 420 slices the data according to the feature combination at different layers to generate, at 425, a group of data segments from a data partition resulted from the specific feature combination. As discussed herein, each feature combination yields a group of data segments and together producing the data segments 430. The DOF scores are then computed, at 435, for each of the data segments 430 and are used by the top segment selector 450 to select, at 445, K data segments that have the top DOF scores. Such selected data segments are then output, at 455, as TIDS-i.

Figure 5A:
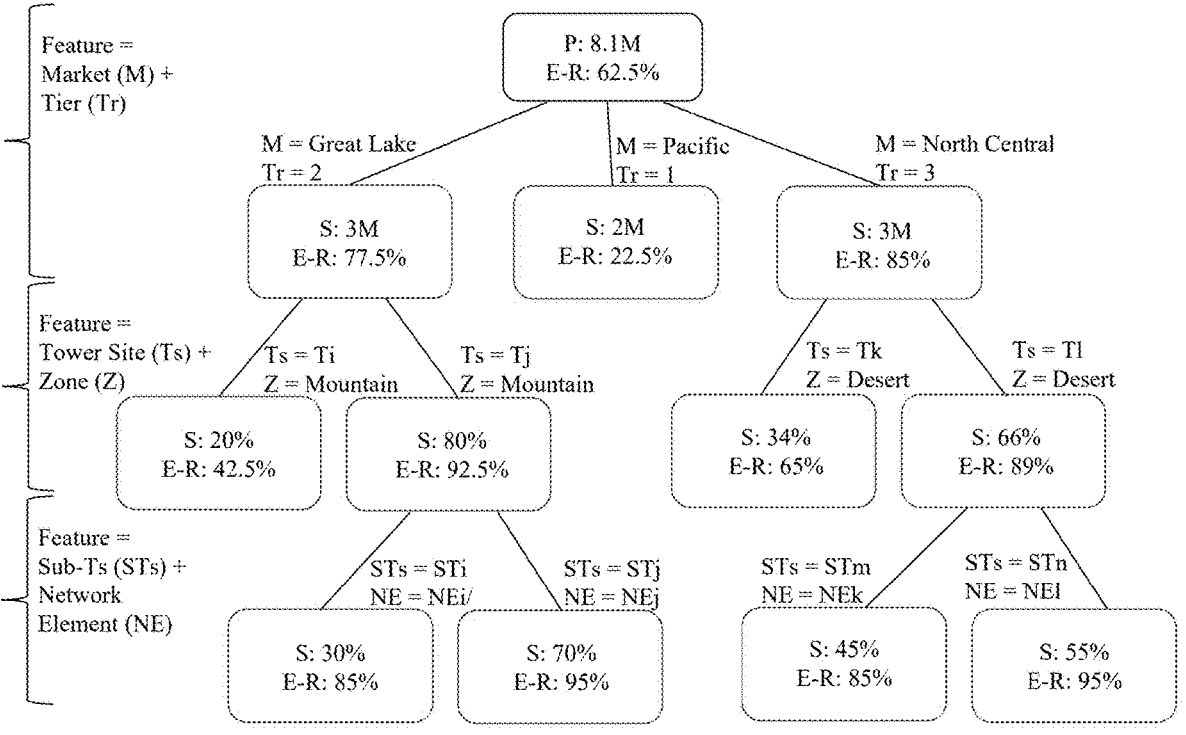
FIG. 5A provides a hierarchy of data segments having top target dependent DOFs selected from various partitions of network management data, in accordance with an embodiment of the present teaching.

FIG. 5A provides an example of a hierarchy of data segments selected from different partitions of network operation data and having top target dependent DOF scores, in accordance with an embodiment of the present teaching. In this example, the target is performance error in network operation, the DOF with respect to this target is error rate (E-R), and features used to slice network operation data include market (M), tier (T), tower site (Ts), zone (Z), sub-tower site (STs), and network element (NE). By dissecting the network operation data using different combinations of these features at different layers, 11 data segments as shown in FIG. 5A correspond to the selected top segments that have the highest DOF scores. As shown, the data population P is 8.1 million, the overall error rate across the population is 62.5%. The objective of this application is to identify top 11 segments of the population (however sliced) that correspond to the highest error rate. In this example, the first layer corresponds to a way of slicing data using a combination of features market M and tier Tr. There are three selected segments at this level of slicing, corresponding to (1) a first segment having a size of 3 million with E-R=77.5% with feature M="Great Lake" and Tr=2, (2) a second segment having a size of 2 million with M="Pacific" and Tr=1, and (3) a third segment at this level having a size of 3 million with M="North Central" and Tr=3.

At the second layer of this example, there are four segments that have DOF scores within the top 11 selected. Two of these four segments (on the left) share features from the first layer with M="Great Lake" and Tr=2. That is, the left most segment at the second layer corresponds to a feature combination of M="Great Lake," Tr=2, Ts=Ti, and Z="Mountain." The second left segment at layer 2 corresponds to a feature combination of M="Great Lake," Tr=2, Ts=Tj, and Z="Mountain." The other two segments (on the right) segments at the second layer in this example share features from the first layer with M="North Central" and Tr=3. As seen, the right most segment at the second layer corresponds to a feature combination of M="North Central," Tr=3, Ts=Tl, and Z="Desert" while the second right segment in the second layer corresponds to a feature combination of M="North Central," Tr=3, Ts=Tk, and Z="Desert." Similarly, at the layer 3, there are also four selected segments, corresponding to their respective feature combinations as shown in FIG. 5A.

These top 11 segments are selected because their E-R (DOF) scores are the highest among all segments identified via the target dependent data dissection as disclosed herein. They are selected as the most significant segments with respect to the target (performance error) because their respective E-R (DOF) scores are 77.5%, 22.5%, 85%, 42.5%, 92.5%, 65%, 89%, 85%, 95%, 85%, and 95%. As the feature combination for each of the selected segments is well define, it is interpretable as to the scope of the segment so that the problem area in the network can be clearly identified. Via the target dependent data dissection scheme according to the present teaching, targeted segments can be recognized or singled out from data segments that are obtained by slicing data based on all possible feature combinations. Although the example as provided in FIG. 5A is a use case of the presentation teaching in an application relating to network management, it is provided merely as an illustration rather than as a limitation. The target dependent data dissecting approach as disclosed herein may be applied to any situation where data from a variety of sources may be explored to identify some parts of the sources with some targeted observations.

Figure 5B:
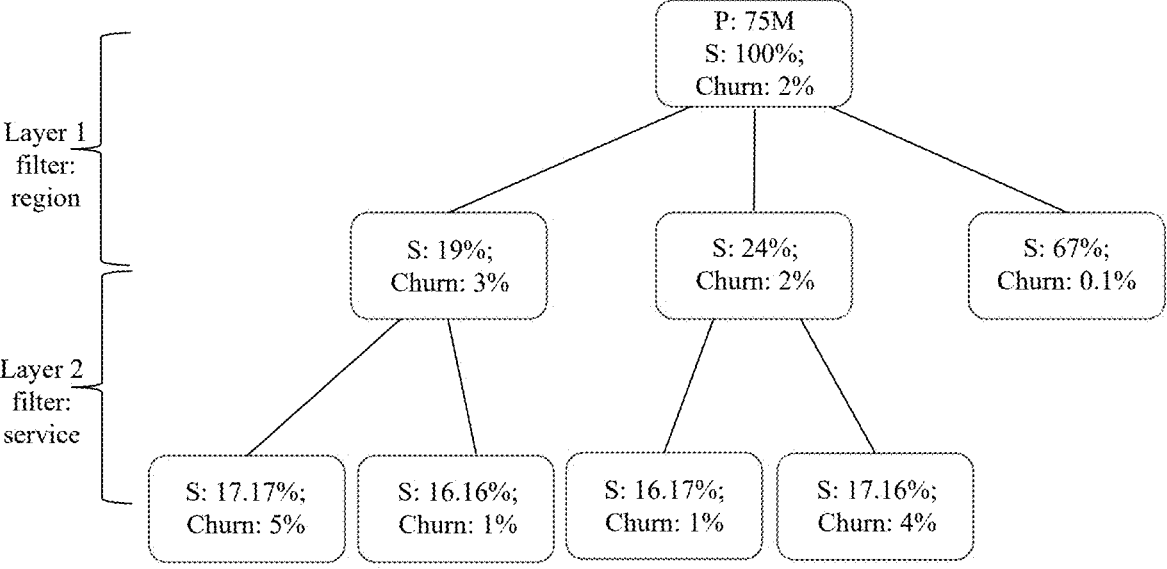
FIG. 5B provides a hierarchy of data segments having top target dependent DOFs selected from various partitions of customer related data, in accordance with an embodiment of the present teaching.

FIG. 5B provides another example hierarchy of data segments with top target dependent DOFs selected from various partitions of customer related data, in accordance with an embodiment of the present teaching. The application as illustrated in this example relates to customer service to identify segments of customers with high churn rates. In this example, the target is a churn rate so that the DOF is defined as churn observed in customers included in each segment. Features to be used to slice data in different combinations may be specified as those that may lead to different ways to group customers. Examples of features that may be used to delineate customer groups may include service region, types of services offered, professions of customers, age groups, etc. The selected groups of customers using the target dependent dissecting scheme provide insight in terms of identifying potential causes for the churn (e.g., bad performance in some services), potential measures that may be adopted to reduce the churn rate in each group, etc.

Figure 6:
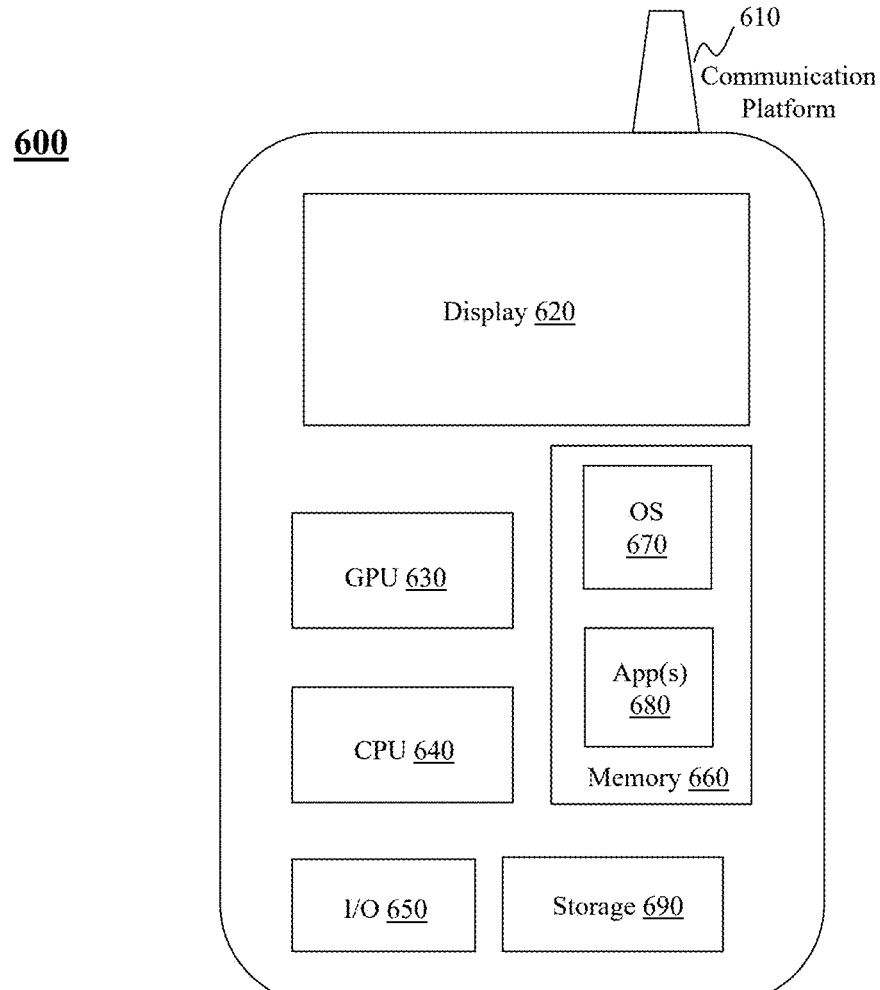
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or a mobile computational unit in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.) and one or more applications 680 may be loaded into memory 660 from storage 690 to be executed by the CPU 640. The applications 680 may include a user interface or any other suitable mobile apps for information exchange, analytics, and management according to the present teaching on, at least partially, the mobile device 600. User interactions, if any, may be achieved via the I/O devices 650 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
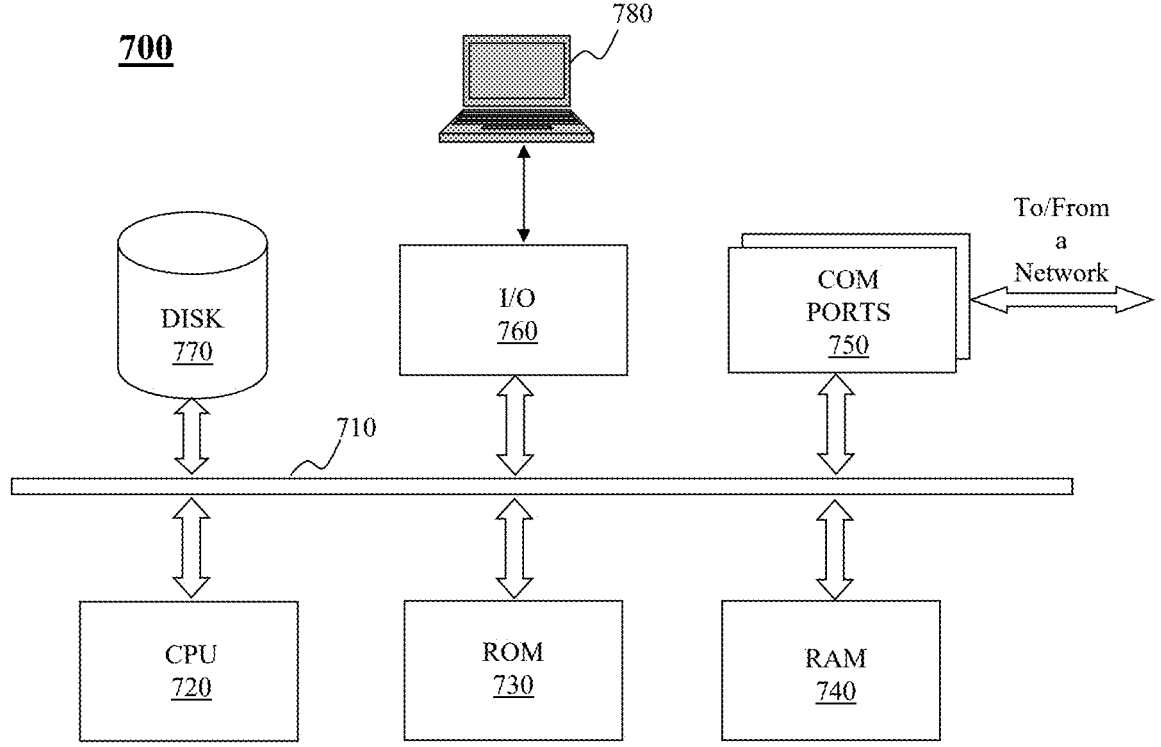
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information processing and analytical method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method, comprising:

specifying one of different targets with respect to one of different network management tasks, wherein each of the different network management tasks manages a corresponding one of different operational aspects of a network;

obtaining one of different dissection objective functions (DOFs) with respect to the specified target, wherein the obtained DOF characterizes an operational aspect of the network to facilitate a network management task to manage an operational aspect of the network, and wherein different DOFs correspond to the different targets, respectively;

extracting multiple features of a data set collected from the operation of the network;

generating a plurality of combinations of the multiple features;

dissecting the data set based on each of the plurality of combinations of the multiple features to generate a partition of the network with a set of sub-network segments;

computing, for each sub-network segment in each of the partitions, a DOF score characterizing the operational aspect of the sub-network segment;

identifying, from the sub-network segments in the plurality of partitions, significant sub-network segments based on their respective DOF scores; and determining, by the network management task, an action to control the operational aspect of each of the most significant sub-network segments.

2. The method of claim 1, wherein the multiple features represent each of the sub-network segments in the network and are determined according to the target.

3. The method of claim 1, wherein the dissecting the data set based on each of the plurality of combinations comprises:

determining a sequence of groups of the multiple features in each of the plurality combinations to be applied in an order, wherein each of the groups includes some of the multiple features; and partitioning data in the data set in a hierarchical manner using each of the sequence of groups in the order based on values of the some of the multiple features in the group.

4. The method of claim 3, wherein the plurality of combinations represents corresponding plurality of ways to partition the data set based on the multiple features.

5. The method of claim 3, wherein the dissecting the data set based on a combination of the multiple features comprises:

applying each of the one or more groups according to the order by, determining the values of the some of the multiple features in the group based on the data in the data set that has a size satisfying a predetermined criterion, dividing the data into different sets according to the determined values, and creating a sub-network segment for each of the different sets; and generating the partition of the data set based on the sub-network segments.

6. The method of claim 1, wherein the computing a DOF score comprises:

obtaining information from the data set relating to the operational aspect of the sub-network; and determining the DOF score for the sub-network segment based on the determined information that characterizes the operational aspect of the sub-network segment.

7. The method of claim 1, wherein the identifying the significant sub-network segments comprises:

accessing a preset criterion provided with respect to the network management task;

evaluating the DOF scores of the sub-network segments in the plurality of partitions against the preset criterion; and selecting the significant sub-network segments with DOF scores that satisfy the preset criterion.

8. A machine-readable and non-transitory medium having information recorded thereon, wherein the information, when read by the machine, causes the machine to perform the following steps:

specifying one of different targets with respect to one of different network management tasks, wherein each of the different network management tasks manages a corresponding one of different operational aspects aspect of a network;

obtaining one of different dissection objective functions (DOFs) with respect to the specified target, wherein the obtained DOF characterizes an operational aspect of the network to facilitate a network management task to manage an operational aspect of the network;

extracting multiple features of a data set collected from the operation of the network;

generating a plurality of combinations of the multiple features;

dissecting the data set based on each of the plurality of combinations of the multiple features to generate a partition of the network with a set of sub-network segments;

computing, for each sub-network segment in each of the partitions, a DOF score characterizing the operational aspect of the sub-network segment;

identifying, from the sub-network segments in the plurality of partitions, significant sub-network segments based on their respective DOF scores; and determining, by the network management task, an action to control the operational aspect of each of the most significant sub-network segments.

9. The medium of claim 8, wherein the multiple features represent each of the sub-network segments in the network and are determined according to the target.

10. The medium of claim 8, wherein the dissecting the data set based on each of the plurality of combinations comprises:

determining a sequence of groups of the multiple features in each of the plurality combinations to be applied in an order, wherein each of the groups includes some of the multiple features; and partitioning data in the data set in a hierarchical manner using each of the sequence of groups in the order based on values of the some of the multiple features in the group.

11. The medium of claim 10, wherein the plurality of combinations represents corresponding plurality of ways to partition the data set based on the multiple features.

12. The medium of claim 10, wherein the dissecting the data set based on a combination of the multiple features comprises:

applying each of the one or more groups according to the order by, determining the values of the some of the multiple features in the group based on the data in the data set that has a size satisfying a predetermined criterion, dividing the data into different sets according to the determined values, and creating a sub-network segment for each of the different sets; and generating the partition of the data set based on the sub-network segments.

13. The medium of claim 8, wherein the computing a DOF score comprises:

obtaining information from the data set relating to the operational aspect of the sub-network; and determining the DOF score for the sub-network segment based on the determined information that characterizes the operational aspect of the sub-network segment.

14. The medium of claim 8, wherein the identifying the significant sub-network segments comprises:

accessing a preset criterion provided with respect to the network management task;

evaluating the DOF scores of the sub-network segments in the plurality of partitions against the preset criterion; and selecting the significant sub-network segments with DOF scores that satisfy the preset criterion.

15. A system comprising:

a network management application implemented by a processor and configured for:

specifying one of different targets with respect to one of different network management tasks, wherein each of the different network management tasks manages a corresponding one of different operational aspects of a network, and obtaining one of different dissection objective functions (DOFs) with respect to the specified target, wherein the obtained DOF characterizes an operational aspect of the network to facilitate a network management task to manage an operational aspect of the network, and wherein different DOFs correspond to the different targets, respectively; and a targeted hierarchical data dissection (THDD) engine implemented by a processor and configured for:

extracting multiple features of a data set collected from the operation of the network, generating a plurality of combinations of the multiple features, dissecting the data set based on each of the plurality of combinations of the multiple features to generate a partition of the network with a set of sub-network segments, computing, for each sub-network segment in each of the partitions, a DOF score characterizing the operational aspect of the sub-network segment, and identifying, from the sub-network segments in the plurality of partitions, significant sub-network segments based on their respective DOF scores, wherein the network management application is further configured for determining, by the network management task, an action to control the operational aspect of each of the most significant sub-network segments.

16. The system of claim 15, wherein the multiple features represent each of the sub-network segments in the network and are determined according to the target; and the plurality of combinations represents corresponding plurality of ways to partition the data set based on the multiple features.

17. The system of claim 15, wherein the dissecting the data set based on each of the plurality of combinations comprises:

determining a sequence of groups of the multiple features in each of the plurality combinations to be applied in an order, wherein each of the groups includes some of the multiple features; and partitioning data in the data set in a hierarchical manner using each of the sequence of groups in the order based on values of the some of the multiple features in the group.

18. The system of claim 17, wherein the dissecting the data set based on a combination of the multiple features comprises:

applying each of the one or more groups according to the order by, determining the values of the some of the multiple features in the group based on the data in the data set that has a size satisfying a predetermined criterion, dividing the data into different sets according to the determined values, and creating a sub-network segment for each of the different sets; and generating the partition of the data set based on the sub-network segments.

19. The system of claim 15, wherein the computing a DOF score comprises:

obtaining information from the data set relating to the operational aspect of the sub-network; and determining the DOF score for the sub-network segment based on the determined information that characterizes the operational aspect of the sub-network segment.

20. The system of claim 15, wherein the identifying the significant sub-network segments comprises:

accessing a preset criterion provided with respect to the network management task;

evaluating the DOF scores of the sub-network segments in the plurality of partitions against the preset criterion; and selecting the significant sub-network segments with DOF scores that satisfy the preset criterion.

* * * * *